(12) United States Patent
Atami et al.

(10) Patent No.: US 10,466,610 B2
(45) Date of Patent: Nov. 5, 2019

(54) CONDUCTIVE MEMBER, CONDUCTIVE ROLLER AND IMAGE FORMING DEVICE

(71) Applicant: BRIDGESTONE CORPORATION, Tokyo (JP)

(72) Inventors: Kiyohiko Atami, Yokohama (JP); Takuro Sugimoto, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 15/503,616

(22) PCT Filed: Aug. 3, 2015

(86) PCT No.: PCT/JP2015/003910
§ 371 (c)(1),
(2) Date: Feb. 13, 2017

(87) PCT Pub. No.: WO2016/031145
PCT Pub. Date: Mar. 3, 2016

(65) Prior Publication Data
US 2017/0242361 A1 Aug. 24, 2017

(30) Foreign Application Priority Data

Aug. 29, 2014 (JP) .................. 2014-176197

(51) Int. Cl.
*B32B 9/04* (2006.01)
*C08F 222/10* (2006.01)
(Continued)

(52) U.S. Cl.
CPC ........... *G03G 15/0233* (2013.01); *C08F 2/50* (2013.01); *C08F 222/1006* (2013.01);
(Continued)

(58) Field of Classification Search
CPC ........ C08F 2222/1086; C08F 222/1006; C08F 2/50; C08K 2201/001; C08K 5/435; C08K 5/55; C09D 135/02; C09D 5/24
(Continued)

(56) References Cited

U.S. PATENT DOCUMENTS

2005/0287481 A1* 12/2005 Kurokawa ............. G03G 9/125
430/331
2007/0154832 A1* 7/2007 Hong ................... G03G 9/0806
430/110.2
(Continued)

FOREIGN PATENT DOCUMENTS

CN 101105652 A 1/2008
CN 101226347 A 7/2008
(Continued)

OTHER PUBLICATIONS

International Search Report of PCT/JP2015/003910 dated Sep. 15, 2015 [PCT/ISA/210].
(Continued)

*Primary Examiner* — Thao T Tran
(74) *Attorney, Agent, or Firm* — Sughrue Mion, PLLC

(57) ABSTRACT

The conductive member of this disclosure is formed of a UV cure resin obtained by curing under ultraviolet ray radiation a composition containing a urethane (meth)acrylate oligomer (A), a photo polymerization initiator (B) and an ionic conductive agent (C), wherein: the ionic conductive agent (C) contains an organic boron complex salt and a compound having a structure expressed with the following general formula (1), and a compounding amount of the organic boron complex salt is 0.2 parts by mass or more per 100 parts by mass of a curing component in the composition.

$$—SO_2—NX—SO_2— \quad (1)$$

(In the general formula (1), X represents an alkali metal.)

6 Claims, 1 Drawing Sheet

(51) Int. Cl.
*C08K 5/55* (2006.01)
*C08K 5/435* (2006.01)
*C09D 135/02* (2006.01)
*G03G 15/02* (2006.01)
*C08F 2/50* (2006.01)
*C09D 5/24* (2006.01)
*G03G 15/08* (2006.01)
*G03G 15/16* (2006.01)

(52) U.S. Cl.
CPC ............. *C08K 5/435* (2013.01); *C08K 5/55* (2013.01); *C09D 5/24* (2013.01); *C09D 135/02* (2013.01); *G03G 15/0818* (2013.01); *G03G 15/162* (2013.01); *G03G 15/1685* (2013.01); *C08F 2222/1086* (2013.01); *C08K 2201/001* (2013.01)

(58) Field of Classification Search
USPC .................... 399/286; 252/519.33, 521.44
See application file for complete search history.

(56) References Cited

U.S. PATENT DOCUMENTS

| | | |
|---|---|---|
| 2007/0197362 A1 | 8/2007 | Sakata et al. |
| 2008/0014514 A1 | 1/2008 | Kamoto |
| 2008/0171273 A1 | 7/2008 | Cheong et al. |
| 2011/0249372 A1 | 10/2011 | Takano et al. |
| 2012/0129666 A1 | 5/2012 | Egashira et al. |
| 2013/0302070 A1* | 11/2013 | Oosaku ............ G03G 15/0808 399/286 |
| 2015/0331339 A1* | 11/2015 | Yamada ............ G03G 5/043 492/18 |
| 2017/0242361 A1 | 8/2017 | Atami et al. |

FOREIGN PATENT DOCUMENTS

| | | |
|---|---|---|
| CN | 101334607 A | 12/2008 |
| CN | 103339571 A | 10/2013 |
| CN | 105093874 A | 11/2015 |
| CN | 106796408 A | 5/2017 |
| EP | 2672326 A1 | 12/2013 |
| JP | 2005-121982 A | 5/2005 |
| JP | 2007-233367 A | 9/2007 |
| JP | 2008-122858 A | 5/2008 |
| JP | 2009-223134 A | 10/2009 |
| JP | 2012-107134 A | 6/2012 |
| JP | 2012-173526 A | 9/2012 |
| WO | 2010/021402 A1 | 2/2010 |
| WO | 2010/021403 A1 | 2/2010 |
| WO | 2016/031145 A1 | 3/2016 |

OTHER PUBLICATIONS

Communication dated Dec. 3, 2018 issued by the China National Intellectual Property Administration in counterpart Chinese application No. 201580046632.4.

Communication dated Jul. 15, 2019, from the State Intellectual Property Office of the P.R.C in application No. 201580046632.4.

* cited by examiner

US 10,466,610 B2

CONDUCTIVE MEMBER, CONDUCTIVE ROLLER AND IMAGE FORMING DEVICE

CROSS REFERENCE TO RELATED APPLICATIONS

This application is a National Stage of International Application No. PCT/JP2015/003910, filed Aug. 3, 2015, claiming priority based on Japanese Patent Application No. 2014-176197, filed Aug. 29, 2014, the contents of all of which are incorporated herein by reference in their entirety.

TECHNICAL FIELD

This disclosure relates to a conductive member, a conductive roller and an image forming device.

BACKGROUND

Conventionally, in a conductive member used in a conductive roller, etc., a conductive agent is added in order to express conductivity.

Here, in the case where the conductive member is formed of a thermosetting resin, carbon can be used as the conductive agent, while in the case where the conductive member is formed of a UV cure resin, if carbon is compounded as the conductive agent, ultraviolet ray does penetrate and thus the UV cure resin does cure.

Therefore, it is known that in the case where the conductive member is formed of a UV cure resin, a colorless, transparent ionic conductive agent is used as the conductive agent instead of carbon.

As the ionic conductive agent, lithium salt (see, e.g., PTL1), organic boron complex salt, alkali metal perchlorate (see, e.g., PTL2), etc. are well known.

CITATION LIST

Patent Literature

PTL1 JP2008-122858A
PTL2 JP2009-223134A

SUMMARY

Technical Problem

As the conductive agent, in the case of using an ionic conductive agent, although it is possible to cure the UV cure resin, a desired electrical resistance initial value cannot be obtained, and in the case where a voltage is applied continuously (in the case of continuous energization), the ionic conductive agent in the cured UV cure material is polarized or even moved, which probably causes increase in the electrical resistance value. Such increase of electrical resistance may cause, e.g., a sharp increase of the resistance of the conductive roller, resulting in image defection.

Then, this disclosure is to provide a conductive member and a conductive roller capable of obtaining a desired electrical resistance initial value and simultaneously suppressing increase of the electrical resistance value due to continuous energization, and an image forming device capable of suppressing occurrence of image defection.

Solution to Problem

We accomplished this disclosure by discovering that, by combining an ion conductive agent which is likely to be polarized or moved with an ionic conductive agent which is unlikely to be polarized or moved, it is possible to obtain a desired electrical resistance initial value, and simultaneously suppress increase of the electrical resistance value due to continuous energization.

Namely, the conductive member of this disclosure is formed of a UV cure resin obtained by curing under ultraviolet ray radiation a composition containing a urethane (meth)acrylate oligomer (A), a photo polymerization initiator (B) and an ionic conductive agent (C), wherein: the ionic conductive agent (C) contains an organic boron complex salt and a compound having a structure expressed with the following general formula (1), and a compounding amount of the organic boron complex salt is 0.2 parts by mass or more per 100 parts by mass of a curing component in the composition.

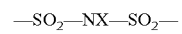
(1)

(In the general formula (1), X represents an alkali metal.)

Advantageous Effect

According to this disclosure, it is possible to provide a conductive member and a conductive roller capable of obtaining a desired electrical resistance initial value and simultaneously suppressing increase of the electrical resistance value due to continuous energization, and an image forming device capable of suppressing occurrence of image defection.

DETAILED DESCRIPTION

Figure 1:
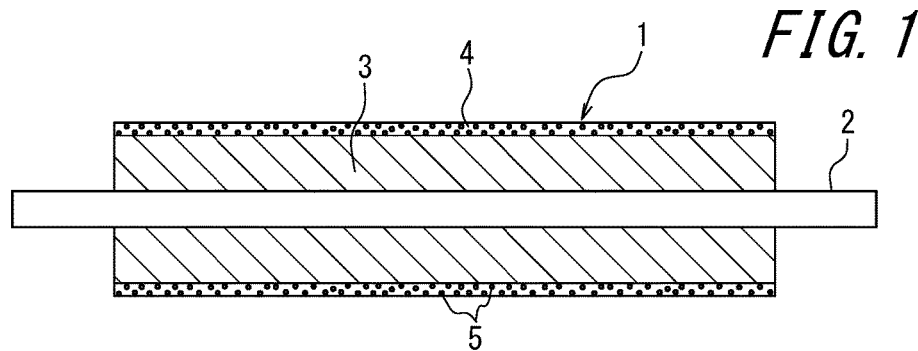
FIG. 1 illustrates a cross-sectional view of an example for the conductive roller of this disclosure.

In the following, an embodiment for embodying this disclosure is exemplified.

In the present Specification, "curing component" refers to a polymerized and cured component, and specifically refers to the "urethane (meth)acrylate oligomer (A) (e.g., the urethane oligomer in Examples)" mentioned below, the "monomer component (D) (e.g., the hydroxyl group monomer in Examples)" mentioned below, etc.

(Conductive Member)

The conductive member of this disclosure is a member formed of a UV cure resin, and is a member used as, e.g., an elastic layer of a conductive roller, an elastic layer of an endless belt, or a conductive sheet.

<UV Cure Resin>

The UV cure resin is a resin obtained by curing a predetermined composition under ultraviolet ray radiation.

The composition contains at least a urethane(meth)acrylate oligomer (A), a photo polymerization initiator (B) and an ionic conductive agent (C), and further contains other components if necessary.

The light source for the ultraviolet ray radiation is not specifically limited, and can be appropriately selected depending on the purpose from, e.g., mercury lamp, high pressure mercury lamp, extra-high pressure mercury lamp, metal halide lamp, xenon lamp.

The conditions for the ultraviolet ray radiation are not specifically limited, and the radiation intensity, the integral of light, etc. can be appropriately selected depending on the components contained in the UV curing resin, the composition of the UV curing resin, the application amount of the UV curing resin, etc.

<<Urethane (Meth)Acrylate Oligomer (A)>>

The urethane(meth)acrylate oligomer (A) is not specifically limited as long as being a compound having one or more acryloyloxy groups ($CH_2$=CHCOO—) and having a plurality of urethane bonds (—NHCOO—), and can be appropriately selected depending on the purpose. For example, it can be an oligomer which can be produced by synthesizing a urethane prepolymer from polyol and polyisocyanate, and adding an acrylate having hydroxyl groups to the urethane prepolymer (e.g., a polyether-based polyol urethane acrylate oligomer), etc. Here, in the synthesis of the urethane prepolymer, a catalyst for urethanation reaction is preferably used.

The number of functional groups and the molecular weight of the urethane (meth)acrylate oligomer (A) is not specifically limited, and can be appropriately selected depending on the purpose.

—Polyol—

The polyol is not specifically limited as long as being a compound having a plurality of hydroxyl groups (OH groups), and may be appropriately selected depending on the purpose from, e.g., polyether polyol, polyester polyol, polytetramethylene glycol, polybutadiene polyol, alkylene oxide-modified polybutadiene polyol, polyisoprene polyol. These may be used singly or in a combination of two or more.

Further, the polyether polyol is obtained by, e.g., adding an alkylene oxide such as ethylene oxide, propylene oxide and the like into a polyhydric alcohol such as ethylene glycol, propylene glycol, glycerin and the like. Moreover, the polyester polyol is obtained from, e.g., a polyhydric alcohol such as ethylene glycol, diethylene glycol, 1,4-butanediol, 1,6-hexanediol, propylene glycol, trimethylolethane, trimethylolpropane and the like, and a polycarboxylic acid such as adipic acid, glutaric acid, succinic acid, sebacic acid, pimelic acid, suberic acid and the like.

—Polyisocyanate—

The polyisocyanate is not specifically limited as long as being a compound having a plurality of isocyanate groups (NCO groups), and can be appropriately selected depending on the purpose from, e.g., tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, hexamethylene diisocyanate (HDI), and isocyanurate-modified products, carbodiimide-modified products and glycol-modified products thereof. These may be used singly or in a combination of two or more.

—Catalyst for Urethanation Reaction—

The catalyst for urethanation reaction is not specifically limited, and can be appropriately selected depending on the purpose from, e.g., organic tin compounds such as dibutyltin dilaurate, dibutyltin diacetate, dibutyltin thiocarboxylate, dibutyltin dimaleate, dioctyltin thiocarboxylate, octenoic acid tin, monobutyltin oxide and the like; inorganic tin compounds such as stannous chloride and the like; organolead compounds such as lead octenate and the like; monoamines such as triethylamine, dimethylcyclohexylamine and the like; diamines such as tetramethylethylenediamine, tetramethylpropanediamine, tetramethylhexanediamine and the like; triamines such as pentamethyldiethylenetriamine, pentamethyldipropylenetriamine, tetramethylguanidine and the like; cyclic amines such as triethylenediamine, dimethylpiperazine, methylethylpiperazine, methylmorpholine, dimethylaminoethylmorpholine, dimethylimidazole, pyridine and the like; alcohol amines such as dimethylaminoethanol, dimethylaminoethoxyethanol, trimethylaminoethylethanolamine, methylhydroxyethylpiperazine, hydroxyethyl morpholine and the like; ether amines such as bis(dimethylaminoethyl)ether, ethylene glycol bis(dimethyl)aminopropyl ether and the like; organic sulfonic acids such as p-toluenesulfonic acid, methanesulfonic acid, fluorosulfuric acid and the like; inorganic acids such as sulfuric acid, phosphoric acid, perchloric acid and the like; bases such as sodium alcoholate, lithium hydroxide, aluminum alcoholate, sodium hydroxide and the like; titanium compounds such as tetrabutyl titanate, tetraethyl titanate, tetra-isopropyl titanate and the like; bismuth compounds; quaternary ammonium salts. These may be used singly or in a combination of two or more.

Among the above, organic tin compounds are preferable.

The amount used of the catalyst is not specifically limited and can be appropriately selected depending on the purpose, but 0.001 to 2.0 parts by mass per 100 parts by mass of the polyol is preferable.

—Acrylate Having Hydroxyl Groups—

The acrylate having hydroxyl groups which is added into the urethane prepolymer is not specifically limited as long as having one or more hydroxyl groups and one or more acryloyloxy groups ($CH_2$=CHCOO—), and can be appropriately selected depending on the purpose from, e.g., 2-hydroxyethyl acrylate, 2-hydroxypropyl acrylate, pentaerythritol triacrylate. These may be used singly or in a combination of two or more.

The acrylate having hydroxyl groups can be added to an isocyanate group of the urethane prepolymer.

<<Photo Polymerization Initiator (B)>>

The photo polymerization initiator (B) has an effect of radiating ultraviolet ray and thereby initiating the polymerization of the urethane(meth)acrylate oligomer (A).

The photo polymerization initiator (B) is not specifically limited, and can be appropriately selected depending on the purpose from, e.g., 1-hydroxycyclohexyl phenyl ketone (e.g., IRGACURE184); 4-dimethylaminobenzoic acid; 4-dimethylaminobenzoic acid ester; 2,2-dimethoxy-2-phenylacetophenone; acetophenone diethyl ketal; alkoxyacetophenone; benzyl dimethyl ketal; benzophenone derivatives such as benzophenone, 3,3-dimethyl-4-methoxybenzophenon, 4,4-dimethoxybenzophenon, 4,4-diaminobenzophenone and the like; alkyl benzoylbenzoate; bis(4-dialkylamino phenyl) ketone; benzyl derivatives such as benzyl, benzyl methyl ketal and the like; benzoin derivatives such as benzoin, benzoin isobutyl ether and the like; benzoin isopropyl ether; 2-hydroxy-2-methyl propyl phenon; xanthone; thioxanthone; thioxanthone derivatives; fluorene; 2,4,6-trimethyl benzoyl diphenyl phosphine oxide; bis(2,6-dimethoxybenzoyl)-2,4,4-trimethylpentyl phosphine oxide; bis(2,4,6-trimethylbenzoyl)-phenyl phosphine oxide; 2-methyl-1-[4-(methylthio)phenyl]-2-morpholinopropane-1,2-benzyl-2-dimethylamino-1-(morpholinophenyl)-butanone-1. These may be used singly or in a combination of two or more.

The compounding amount of the photo polymerization initiator (B) is not specifically limited, and can be appropriately selected depending on the purpose, but is specifically 0.2 to 5.0 parts by mass per 100 parts by mass of the curing component in the composition (the components such as the urethane(meth)acrylate oligomer (A), the acrylate monomer (D) mentioned below and the like).

If the compounding amount of the photo polymerization initiator (B) is 0.2 parts by mass or more, it is possible to obtain sufficient effect of initiating UV curing, and if 5.0 parts by mass or less, it is possible to obtain the effect of initiating UV curing and simultaneously reduce the cost.

<<Ionic Conductive Agent (C)>>

The ionic conductive agent (C) contains at least an organic boron complex salt and a compound having a structure represented with the following general formula (1) (hereinafter referred to as "the imide compound"), and further contains other components if necessary.

—SO$_2$—NX—SO$_2$—     (1)

(In the general formula (1), X represents an alkali metal.)

—Organic Boron Complex Salt—

By adding the organic boron complex salt, it is possible to suppress increase of the electrical resistance value after continuous energization.

The organic boron complex salt is not specifically limited, and can be appropriately selected depending on the purpose from, e.g., organic boron complex potassium salt, organic boron complex sodium salt, organic boron complex lithium salt. These may be used singly or in a combination of two or more.

Among the above, organic boron complex potassium salt is preferable because of its capability of suppressing increase of the electrical resistance value due to continuous energization.

——Organic Boron Complex Potassium Salt——

The organic boron complex potassium salt is not specifically limited, and can be appropriately selected depending on the purpose from, e.g., borobis(1,1-diphenyl-1-oxo-acetyl)potassium. These may be used singly or in a combination of two or more.

Among the above, borobis(1,1-diphenyl-1-oxo-acetyl)potassium is preferable because of its capability of suppressing increase of the electrical resistance value due to continuous energization.

——Organic Boron Complex Sodium Salt——

The organic boron complex sodium salt is not specifically limited, and can be appropriately selected depending on the purpose from, e.g., borobis(1,1-diphenyl-1-oxo-acetyl)sodium. These may be used singly or in a combination of two or more.

Among the above, borobis(1,1-diphenyl-1-oxo-acetyl)sodium is preferable because of its capability of suppressing increase of the electrical resistance value due to continuous energization.

——Organic Boron Complex Lithium Salt——

The organic boron complex lithium salt is not specifically limited, and can be appropriately selected depending on the purpose from, e.g., borobis(1,1-diphenyl-1-oxo-acetyl) lithium. These may be used singly or in a combination of two or more.

Among the above, borobis(1,1-diphenyl-1-oxo-acetyl) lithium is preferable because of its capability of suppressing increase of the electrical resistance value due to continuous energization.

The compounding amount of the organic boron complex salt is not specifically limited, and can be appropriately selected depending on the purpose as long as being 0.2 parts by mass per 100 parts by mass of the curing component in the composition (components such as the urethane(meth) acrylate oligomer (A), the monomer component (D) mentioned below and the like), but is preferable 0.2 to 5.0 parts by mass, more preferably 1.0 to 4.0 parts by mass, further more preferably 2.0 to 3.0 parts by mass.

If the compounding amount of the organic boron complex salt is 0.2 parts by mass or more, it is possible to suppress increase of the electrical resistance value due to continuous energization. On the other hand, if the compounding amount of the organic boron complex salt is within the preferable range, the more preferable range or the further more preferable range, it is advantageous due to its capability of suppressing increase of the electrical resistance value due to continuous energization, and simultaneously preventing ion bleeding.

—Imide Compound—

The imide compound in the present Specification is an imide compound having a structure represented with the aforementioned general formula (1).

Specific examples of the imide compound is not specifically limited, and can be appropriately selected depending on the purpose from, e.g., potassium N,N-bis(trifluoromethanesulfonyl)imide, lithium N,N-bis(trifluoromethanesulfonyl)imide, potassium N,N-bis(nonafluorobutanesulfonyl) imide, potassium N,N-bis(fluorosulfonyl)imide. These may be used singly or in a combination of two or more.

Among the above, potassium N,N-bis(trifluoromethanesulfonyl)imide is preferable because of its capability of further suppressing increase of the electrical resistance value due to continuous energization.

By adding the imide compound, it is possible to obtain a desired electrical resistance initial value.

The compounding amount the imide compound is not specifically limited, and can be appropriately selected depending on the purpose, but is preferably 0.1 to 4.0 parts by mass, more preferably 0.5 to 4.0 parts by mass, further more preferably 1.0 to 3.0 parts by mass per 100 parts by mass of the curing component in the composition (components such as the urethane(meth)acrylate oligomer (A), the monomer component (D) mentioned below and the like).

If the compounding amount of the imide compound is 0.1 parts by mass or more, it is possible to set the electrical resistance initial value within a more preferable range, and if 4.0 parts by mass or less, it is possible to reduce ion bleeding.

The compounding amount of the compound having the structure represented with the aforementioned general formula (1) is preferable 0.1 to 4 parts by mass per 100 parts by mass of the curing component in the composition.

According to this configuration, it is possible to securely obtain a desired electrical resistance initial value, and simultaneously, securely prevent ion bleeding.

——Alkali Metal X in General Formula (1)——

The alkali metal X in the general formula (1) is not specifically limited, and can be appropriately selected depending on the purpose from, e.g., potassium, lithium.

Among the above, potassium is preferable because of its capability of suppressing increase of the electrical resistance value due to continuous energization.

<<Other Components>>

The other components of the composition used when producing the UV curing resin are not specifically limited, and can be appropriately selected depending on the purpose from, e.g., a monomer component (D) such as acrylate monomer and the like, a polymerization inhibitor (E) for preventing thermal polymerization before UV radiation.

The composition which is cured by radiating ultraviolet ray preferably further contains a monomer having a hydroxyl group skeleton. According to this configuration, it is possible to further extend the duration under energization.

In the case of containing the monomer component (D), the mass ratio (A/D) of the urethane(meth)acrylate oligomer (A) to the monomer component (D) is not specifically limited, and can be appropriately selected depending on the purpose, but is preferably 100/0 to 10/90.

If the mass ratio (A/D) of the urethane(meth)acrylate oligomer (A) to the monomer (D) is 100/0 to 10/90, it is possible to obtain a preferable conductive member as an elastic layer of the conductive roller.

—Acrylate Monomer—

The acrylate monomer is not specifically limited, and can be appropriately selected depending on the purpose from, e.g., 2-hydroxypropyl acrylate, isomyristyl acrylate, methoxy triethylene glycol acrylate, lauryl acrylate, tripropylene glycol diacrylate (e.g., "APG-200", made by Shin-Nakamura Chemical Co., Ltd.), polyethylene glycol diacrylate (e.g., "LIGHT ACRYLATE 4EG-A" made by Kyoeisha Chemical Co., Ltd.), ethyl acrylate, isobutyl acrylate, n-butyl acrylate, isoamyl acrylate, glycidyl acrylate, butoxy ethyl acrylate, ethoxydiethylene glycol acrylate, methoxydipropylene acrylate, phenoxyethyl acrylate, 2-hydroxyethyl acrylate, pentaerythritol triacrylate, β-acryloyloxyethyl hydrogen succinate. These may be used singly or in a combination of two or more.

Among the above, acrylate monomers having a hydroxyl group skeleton (e.g., 2-hydroxypropyl acrylate, 2-hydroxyethyl acrylate) are preferable because of its capability of reducing resistance variation.

—Polymerization Inhibitor (E)—

The polymerization inhibitor (E) is not specifically limited, and can be appropriately selected depending on the purpose from, e.g., hydroquinone, hydroquinone monomethyl ether, p-methoxyphenol, 2,4-dimethyl-6-t-butylphenol, 2,6-di-t-butyl-p-cresol, butylated hydroxyanisole, 3-hydroxythiophenol, α-nitroso-β-naphthol, p-benzoquinone, 2,5-dihydroxy-p-quinone.

The compounding amount of the polymerization inhibitor (E) is not specifically limited, and can be appropriately selected depending on the purpose, but is preferably 0.001 to 0.2 parts by mass per 100 parts by mass of the curing component in the composition (the components such as the urethane(meth)acrylate oligomer (A), the acrylate monomer (D) and the like).

According to the conductive member of this disclosure, it is possible to obtain a desired electrical resistance initial value and simultaneously suppress increase of the electrical resistance value due to continuous energization.

Here, the mechanism of the capability of suppressing increase of the electrical resistance value due to continuous energization is considered as that: the organic boron complex salt, which has a large molecular weight and is unlikely to move, is dispersed, and the compound having the structure represented with the aforementioned general formula (1), which has a comparatively small molecular weight and is likely to move, exists among the dispersed organic boron complex salt, and thus ionic movements are suppressed and electronic movements are caused.

(Conductive Roller)

FIG. 1 is a cross-sectional view of an example for the conductive roller of this disclosure. The conductive roller 1 of FIG. 1 includes a shaft member 2 attached in a manner such that both its lengthwise end portions are pivoted, and an elastic layer 3 disposed on a radial outer side of the shaft member 2. Here, the conductive roller 1 as illustrated in FIG. 1 has one elastic layer 3, but may have two or more elastic layers as well. Moreover, the conductive roller 1 as illustrated in FIG. 1 includes a surficial layer on a radial outer side of the elastic layer 3. Moreover, in the conductive roller 1 as illustrated in FIG. 1, the surficial layer 4 contains microparticles 5, but does not necessarily have microparticles. Further, the conductive roller 1 as illustrated in FIG. 1 has one surficial layer 4, but may have two or more surficial layers as well.

The type of the conductive roller of this disclosure is not specifically limited, and can be appropriately selected depending on the purpose from, e.g., charging roller, toner supply roller, developing roller, transfer roller, paper supply roller, cleaning roller, pressure roller for fixation. In particular, it is preferable to use the conductive roller as a charging roller which needs stable current carrying properties, from the viewpoint of current carrying durability effect.

<Shaft Member>

The conductive roller of this disclosure includes a shaft member.

The shaft member is not specifically limited as long as have an excellent conductivity, and can be appropriately selected depending on the purpose from, e.g., metal, resin, hollow cylinder, solid cylinder. These may be used singly or in a combination of two or more.

<Elastic Layer>

The conductive roller of this disclosure includes at least one or more elastic layers arranged on the radial outer side of the shaft member.

The elastic layer is not specifically limited, and can be appropriately selected depending on the purpose, as long as being formed with the conductive member of this disclosure.

The method for applying the material for the elastic layer onto the outer surface of the shaft member in order to form the elastic layer on the conductive roller of this disclosure is not specifically limited, and can be appropriately selected depending on the purpose from, e.g., spraying, roll coater, dipping, die coating.

<Surficial Layer>

The conductive roller of this disclosure includes a surficial layer if necessary.

The surficial layer is formed on the outer circumferential surface of the elastic layer in order to, e.g., improve the hardness of the roller, control the chargeability and adhesiveness to the toner, reduce the frictional force to the photosensitive drum and the stratified blade, etc., and thereby prevent contamination to the photosensitive drum, etc. due to the elastic layer.

The material contained in the surficial layer is not specifically limited, and can be appropriately selected depending on the purpose from, e.g., UV cure resin, fluorine-containing resin, microparticles. These may be used singly or in a combination of two or more.

The conductive roller of this disclosure is capable of suppressing increase of the roller resistance, by including a shaft member, and at least one or more elastic layers which are arranged on the radial outer side of the shaft member and formed with the conductive member of this disclosure.

(Image Forming Device)

The image forming device of this disclosure includes a conductive roller of this disclosure. The image forming device of this disclosure can be produced with a well-known method.

Figure 2:
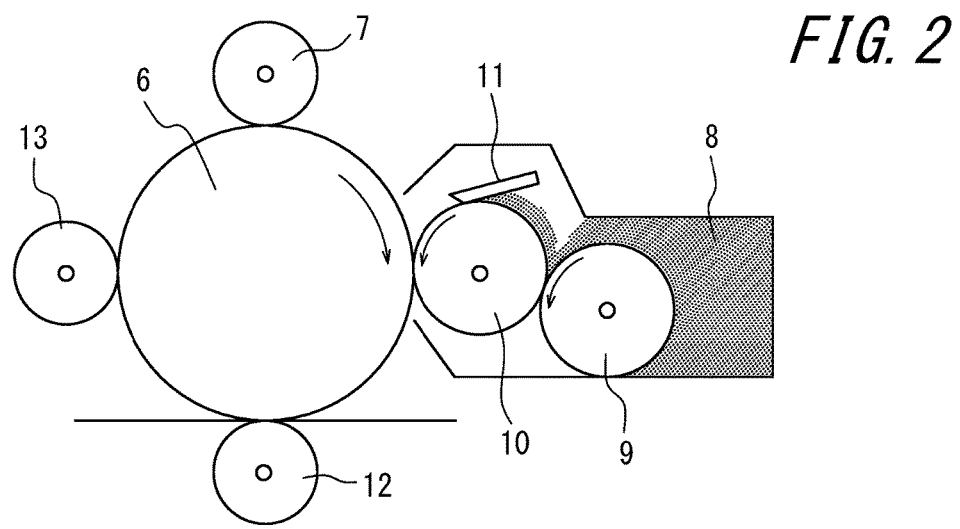
FIG. 2 illustrates a partial cross-sectional view of an example for the image forming device of this disclosure.

Hereinafter, the image forming device of this disclosure is described by referring to the drawings. FIG. 2 is a partial cross-sectional view of an example of the image forming device of this disclosure. The image forming device of FIG. 2 includes a photosensitive drum 6 for maintaining an electrostatic latent image, a charging roller 7 for charging the photosensitive drum 6 which is located in the vicinity of the photosensitive drum 6 (the upper position in FIG. 2), a toner supply roller 9 for supplying a toner 8, a developing roller 10 arranged between the toner supply roller 9 and the photosensitive drum 6, a stratified blade 11 disposed in the vicinity of the developing roller 10 (the upper position in FIG. 2), a transfer roller 12 located in the vicinity of the photosensitive drum 6 (the upper position in FIG. 2), and a cleaning roller 13 arranged adjacent to the photosensitive drum 6. Here, the image forming device of this disclosure may further include well-known members (not illustrated) which are ordinarily used in an image forming device.

In the image forming device of FIG. 2, after contacting the photosensitive drum 6 to the charging roller 7, applying a voltage between the photosensitive drum 6 and the charging roller 7, and charging the photosensitive drum 6 to a determined potential, an electrostatic latent image is formed on the photosensitive drum 6 via an exposure machine (not illustrated). Next, the photosensitive drum 6, the toner supply roller 9 and the developing roller 10 rotate along the arrow in the drawing, and thereby, the toner 8 on the toner supply roller 9 is passed to the photosensitive drum 6 via the developing roller 10. The toner 8 on the developing roller 10 is applied with a uniform thin layer due to the stratified blade 11, and due to contact and rotation of the developing roller 10 and the photosensitive drum 6, the toner 8 is attached from the developing roller 10 to the electrostatic latent image of the photosensitive drum 6, which visualizes the latent image. The toner 8 attached to the latent image is transferred to a recording media such as paper and the like with the transfer roller 12, and the toner 8 remaining on the photosensitive drum 6 after transfer is removed with the cleaning roller 13. Here, the conductive roller of this disclosure can be used in one or more of the charging roller 7, the toner supply roller 9, the developing roller 10, the transfer roller 12 and the cleaning roller 13.

By including the conductive roller of this disclosure, the image forming device of this disclosure is capable of suppressing occurrence of image defection.

(Endless Belt)

An example for the endless belt used by the conductive member of this disclosure is described in the following with drawings.

Figure 3:
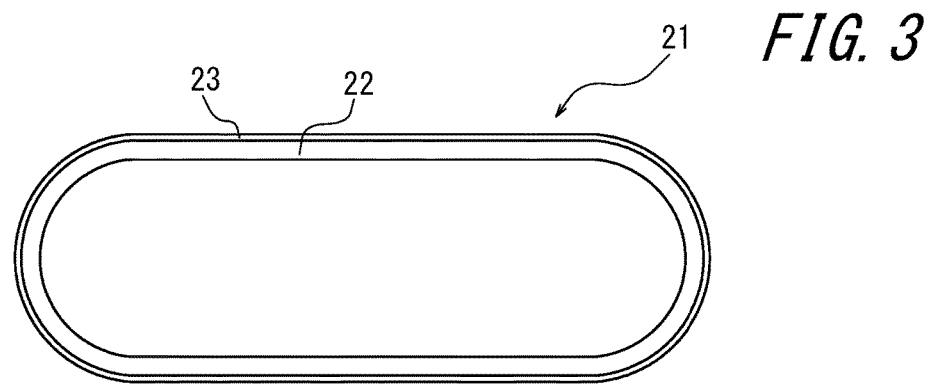
FIG. 3 illustrates a schematic side view of an example for an endless belt using the conductive member of this disclosure.

As illustrated in FIG. 3, the endless belt 21 includes an endless belt base 22 with a monolayer structure, and an elastic layer 23 formed on an outer circumferential surface of the endless belt base 22 and formed with the conductive member of this disclosure.

EXAMPLES

Hereinafter, this disclosure is further described in details by referring to examples, while this disclosure is not limited to the following examples, but may be performed by varying within the scope of the subject thereof.

Example 1

As shown in Table 1, 90 parts by mass of a polyether based polyolurethane acrylate oligomer having acryloyloxy groups ($CH_2$=CHCOO—) on its terminals (made by Asia Industry Co., Ltd., trade name: NX44-31, molecular weight: 18000) as a urethane oligomer, 10 parts by mass of 2-hydroxypropyl acrylate (made by Kyoeisha Chemical Co., Ltd.) as a hydroxyl group monomer, 1 part by mass of a UV polymerization initiator (made by BASF, trade name: IRGACURE184), 3 parts by mass of borobis(1,1-diphenyl-1-oxo-acetyl)potassium (made by Japan Carlit Co., Ltd.) as an ionic conductive agent, and 3 parts by mass of potassium N,N-bis(trifluoromethanesulfonyl)imide (made by Mitsubishi Materials Electronic Chemicals Co., Ltd.) were compounded and blended with a mixer, to produce a composition for elastic layer.

Then, as shown below, the initial resistance value, the durability under energization and the ion bleeding preventing properties were evaluated.

<Initial Resistance Value and Durability Under Energization>

—Preparation of sample for conductive member for evaluation—

The prepared composition for elastic layer was disposed between two PET films (made by Toray Industries, Inc., trade name: Lumirror). At that time, a spacer was sandwiched such that the distance between the two PET films (the thickness of the composition for elastic layer) was 1 mm, and was radiated for 1 minute under an ultraviolet ray (intensity: 300 W/cm$^2$) with a UV radiation device (made by Fusion UV Systems Japan K.K., trade name: F300S), thereby the composition for elastic layer was cured to obtain a sheet with a thickness of 1 mm. The obtained sheet was punched out into a circular shape with a diameter of 15 mm, to prepare a sheet of a cylindrical shape with a diameter of 15 mm and a thickness of 1 mm. On both sides of the prepared sheet, a conductive rubber sheet (made by Tigers Polymer Corporation, trade name: EP-2) with a diameter of 15 mm was brought into intimate contact, to prepare a sample for conductive member for evaluation.

—Initial Resistance Value and Durability Under Energization—

The obtained sample for conductive member for evaluation was carried on a metallic plate made of iron of a negative electrode, a positive electrode made of copper with a diameter of 10 mm was attached therebetween at a strength of 50 g load, a voltage is applied to the sample for conductive member for evaluation such that a DC constant current of 300 µA flows therein, and the initial resistance value and duration under energization (the time for the time initial voltage to vary by 0.4 in terms of common logarithms in the case where the time initial voltage is 0 in terms of common logarithms) were measured. The initial resistance values and the durations under energization were as shown in Table 1-3.

The initial resistance value is a value of the initial voltage divided by the DC constant current.

The duration under energization in Table 1-3 is the measured value and an index value with the measured value of Example 1. If the index value is 70 or more, the variation of the resistance value from the initial resistance value after printing 80000 pages is low, which enables printing of excellent images and thus is preferable.

<Ion Bleeding Preventing Properties>

—Preparation of Sample for Conductive Roller for Evaluation—

An elastic layer with a thickness of 3 mm was applied via die coating to a metallic shaft with a diameter of 6 mm, and then subjected to UV radiation (intensity: 3000 mW/cm$^2$, duration: 10 seconds) to be cured. The material of the elastic layer was added according to the material of each example or comparative example.

Moreover, the surficial layer was applied to the surface of the elastic layer via roll coating with a thickness of 1 to 10 µm, and then subjected to UV radiation (intensity: 3000 mW/cm$^2$, duration: 10 seconds) to be cured, and thereby a sample for conductive roller for evaluation having an elastic layer was prepared.

Used as the material of the surficial layer were a urethane acrylate oligomer (100 parts by mass), a conductive carbon (3 parts by mass), an acryl particle having a particle size of 6 μm (60 parts by mass), a photo polymerization initiator (1 part by mass), a hydrophobic silica (15 parts by mass), and used as a diluting solvent was butyl acetate (100 parts by mass).

—Evaluation of Ion Bleeding Preventing Properties—

The ion bleed preventing properties of the obtained sample of conductive roller for evaluation was evaluated via image evaluation. The evaluation results were as shown in Tables 1-3. Here, in Tables 1-3, "excellent" represents for no ion bleeding after printing 80000 pages, "good" represents for no ion bleeding after printing 40000 pages but ion bleeding after printing 50000 pages, and "fair" represents for no ion bleeding after printing 20000 pages but ion bleeding after printing 30000 pages.

Example 2

Similarly as in Examples 1 except that borobis(1,1-diphenyl-1-oxo-acetyl)sodium (made by Japan Carlit Co., Ltd.) was used instead of borobis(1,1-diphenyl-1-oxo-acetyl)potassium used in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 1.

Example 3

Similarly as in Example 1 except that borobis(1,1-diphenyl-1-oxo-acetyl)lithium (made by Japan Carlit Co., Ltd.) was used instead of borobis(1,1-diphenyl-1-oxo-acetyl)potassium used in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 1.

Example 4

Similarly as in Example 1 except that lithium N,N-bis(trifluoromethanesulfonyl)imide (made by Mitsubishi Materials Electronic Chemicals Co., Ltd.) was used instead of potassium N,N-bis(trifluoromethanesulfonyl)imide in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 1.

Comparative Example 1

Similarly as in Example 1 except that potassium N,N-bis(trifluoromethanesulfonyl)imide in Example 1 was not used, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 1.

Comparative Example 2

Similarly as in Example 1 except that borobis(1,1-diphenyl-1-oxo-acetyl)potassium in Example 1 was not used, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 1.

Comparative Example 3

Similarly as in Example 1 except that the compounding amount of borobis(1,1-diphenyl-1-oxo-acetyl)potassium was varied to 0.1 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 5

Similarly as in Example 1 except that the compounding amount of borobis(1,1-diphenyl-1-oxo-acetyl)potassium was varied to 0.2 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 6

Similarly as in Example 1 except that the compounding amount of borobis(1,1-diphenyl-1-oxo-acetyl)potassium was varied to 1 part by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 7

Similarly as in Example 1 except that the compounding amount of borobis(1,1-diphenyl-1-oxo-acetyl)potassium was varied to 4 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 8

Similarly as in Example 1 except that the compounding amount of borobis(1,1-diphenyl-1-oxo-acetyl)potassium was varied to 5 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 9

Similarly as in Example 1 except that the compounding amount of borobis(1,1-diphenyl-1-oxo-acetyl)potassium was varied to 6 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 2.

Example 10

Similarly as in Example 1 except that the compounding amount of potassium N,N-bis(trifluoromethanesulfonyl)imide in Example 1 was varied to 0.1 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 11

Similarly as in Example 1 except that the compounding amount of potassium N,N-bis(trifluoromethanesulfonyl)imide in Example 1 was varied to 0.5 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 12

Similarly as in Example 1 except that the compounding amount of potassium N,N-bis(trifluoromethanesulfonyl)imide in Example 1 was varied to 1 part by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 13

Similarly as in Example 1 except that the compounding amount of potassium N,N-bis(trifluoromethanesulfonyl)imide in Example 1 was varied to 2 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 14

Similarly as in Example 1 except that the compounding amount of potassium N,N-bis(trifluoromethanesulfonyl)imide in Example 1 was varied to 4 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 15

Similarly as in Example 1 except that the compounding amount of potassium N,N-bis(trifluoromethanesulfonyl)imide in Example 1 was varied to 5 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 16

Similarly as in Example 1 except that the compounding amount of potassium N,N-bis(trifluoromethanesulfonyl)imide in Example 1 was varied to 6 parts by mass instead of 3 parts by mass as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

Example 17

Similarly as in Example 1 except that the compounding amount of the polyether based polyolurethane acrylate oligomer was 100 parts by mass, and the compounding amount of 2-hydroxypropyl acrylate was 0 parts by mass, instead of 90 parts by mass of the polyether based polyolurethane acrylate oligomer and 10 parts by mass of 2-hydroxypropyl acrylate as in Example 1, a composition for elastic layer was prepared, the initial resistance value and the durability under energization of a sample for conductive member for evaluation were evaluated, and the ion bleeding preventing properties of a sample for conductive roller for evaluation were evaluated. The evaluation results were as shown in Table 3.

TABLE 1

| Material | Example 1 | Example 2 | Example 3 | Example 4 | Comparative Example 1 | Comparative Example 2 |
| --- | --- | --- | --- | --- | --- | --- |
| Urethane oligomer | 90 | 90 | 90 | 90 | 90 | 90 |
| Hydroxyl group monomer | 10 | 10 | 10 | 10 | 10 | 10 |

TABLE 1-continued

| Material | Example 1 | Example 2 | Example 3 | Example 4 | Comparative Example 1 | Comparative Example 2 |
|---|---|---|---|---|---|---|
| UV polymerization initiator | 1 | 1 | 1 | 1 | 1 | 1 |
| Borobis(1,1-diphenyl-1-oxo-acetyl)potassium | 3 | — | — | 3 | 3 | — |
| Borobis(1,1-diphenyl-1-oxo-acetyl)sodium | — | 3 | — | — | — | — |
| Borobis(1,1-diphenyl-1-oxo-acetyl)lithium | — | — | 3 | — | — | — |
| Potassium N,N-bis(trifluoromethanesulfonyl)imide | 3 | 3 | 3 | — | — | 3 |
| Lithium N,N-bis(trifluoromethanesulfonyl)imide | — | — | — | 3 | — | — |
| Initial resistance value (unit: Ω) | $9.1 \times 10^4$ | $9.0 \times 10^4$ | $8.6 \times 10^4$ | $7.5 \times 10^4$ | $7.1 \times 10^5$ | $9.2 \times 10^4$ |
| Duration under energization (measured value) | 90.0 | 87.3 | 86.4 | 73.8 | 61.2 | 18.9 |
| Durability under energization (index value) | 100 | 97 | 96 | 82 | 68 | 21 |
| Ion bleeding preventing properties | Excellent | Excellent | Excellent | Excellent | Excellent | Excellent |

TABLE 2

| Material | Example 1 | Comparative Example | Example 5 | Example 6 | Example 7 | Example 8 | Example 9 |
|---|---|---|---|---|---|---|---|
| Urethane oligomer | 90 | 90 | 90 | 90 | 90 | 90 | 90 |
| Hydroxyl group monomer | 10 | 10 | 10 | 10 | 10 | 10 | 10 |
| UV polymerization initiator | 1 | 1 | 1 | 1 | 1 | 1 | 1 |
| Borobis(1,1-diphenyl-1-oxo-acetyl)potassium | 3 | 0.1 | 0.2 | 1 | 4 | 5 | 6 |
| Borobis(1,1-diphenyl-1-oxo-acetyl)sodium | — | — | — | — | — | — | — |
| Borobis(1,1-diphenyl-1-oxo-acetyl)lithium | — | — | — | — | — | — | — |
| Potassium N,N-bis(trifluoromethanesulfonyl)imide | 3 | 3 | 3 | 3 | 3 | 3 | 3 |
| Lithium N,N-bis(trifluoromethanesulfonyl)imide | — | — | — | — | — | — | — |
| Initial resistance value (unit: Ω) | $9.1 \times 10^4$ | $9.3 \times 10^4$ | $9.3 \times 10^4$ | $9.2 \times 10^4$ | $9.0 \times 10^4$ | $9.0 \times 10^4$ | $8.9 \times 10^4$ |
| Duration under energization (measured value) | 90.0 | 54.9 | 63.9 | 82.8 | 95.4 | 95.4 | 97.2 |
| Durability under energization (index value) | 100 | 61 | 71 | 92 | 106 | 106 | 108 |
| Ion bleeding preventing properties | Excellent | Excellent | Excellent | Excellent | Excellent | Excellent | fair |

TABLE 3

| Material | Example 1 | Example 10 | Example 11 | Example 12 | Example 13 | Example 14 | Example 15 | Example 16 | Example 17 |
|---|---|---|---|---|---|---|---|---|---|
| Urethane oligomer | 90 | 90 | 90 | 90 | 90 | 90 | 90 | 90 | 100 |
| Hydroxyl group monomer | 10 | 10 | 10 | 10 | 10 | 10 | 10 | 10 | 0 |
| UV polymerization initiator | 1 | 1 | 1 | 1 | 1 | 1 | 1 | 1 | 1 |
| Borobis(1,1-diphenyl-1-oxo-acetyl)potassium | 3 | 3 | 3 | 3 | 3 | 3 | 3 | 3 | 3 |
| Borobis(1,1-diphenyl-1-oxo-acetyl)sodium | — | — | — | — | — | — | — | — | — |
| Borobis(1,1-diphenyl-1-oxo-acetyl)lithium | — | — | — | — | — | — | — | — | — |
| Potassium N,N-bis(trifluoromethanesulfonyl)imide | 3 | 0.1 | 0.5 | 1 | 2 | 4 | 5 | 6 | 3 |
| Lithium N,N-bis(trifluoromethanesulfonyl)imide | — | — | — | — | — | — | — | — | — |
| Initial resistance value (unit: Ω) | $9.1 \times 10^4$ | $5.0 \times 10^5$ | $3.3 \times 10^5$ | $1.6 \times 10^5$ | $1.1 \times 10^5$ | $7.6 \times 10^4$ | $7.2 \times 10^4$ | $6.4 \times 10^4$ | $9.4 \times 10^4$ |
| Duration under energization (measured value) | 90.0 | 88.2 | 89.1 | 90.0 | 90.0 | 91.8 | 93.6 | 94.5 | 63.9 |
| Durability under energization (index value) | 100 | 98 | 99 | 100 | 100 | 102 | 104 | 105 | 71 |
| Ion bleeding preventing properties | Excellent | Excellent | Excellent | Excellent | Excellent | Excellent | Good | fair | Excellent |

Comparing Examples 1-3 in table 1, it was understood that borobis(1,1-diphenyl-1-oxo-acetyl)potassium, which is a potassium comMaterialplex, is preferable as the organic boron complex salt because of its capability of extending the duration under energization.

According to Table 1, it was understood that in Comparative Example 1, where merely an organic boron complex salt (borobis(1,1-diphenyl-1-oxo-acetyl)potassium) was compounded without compounding an imide compound, it was impossible to obtain a desired initial resistance value, and the durability under energization was low as well.

According to Table 1, it was understood that in Comparative Example 2, where merely an imide compound (potassium N,N-bis(trifluoromethanesulfonyl)imide) was compounded without compounding an organic boron complex salt, the duration under energization was as short as 19 minutes or less, while on the other hand, in Example 1, where a combination of an organic boron complex salt (borobis(1,1-diphenyl-1-oxo-acetyl)potassium) and an imide compound (potassium N,N-bis(trifluoromethanesulfonyl)imide) was compounded, the duration under energization was extended to 90 minutes.

According to Table 2, in Comparative Example 3, where the content of organic boron complex salt (borobis(1,1-diphenyl-1-oxo-acetyl)potassium) was excessively low, it was impossible to obtain sufficient duration under energization, and in Example 9, where the content of organic boron complex salt (borobis(1,1-diphenyl-1-oxo-acetyl)potassium) was excessively high, it was impossible to obtain sufficient ion bleeding preventing properties.

According to Table 3, it was understood that in Examples 10 to 14, where the imide compound (potassium N,N-bis (trifluoromethanesulfonyl)imide) was compounded at an appropriate amount, it was possible to obtain both durability under energization and ion bleeding preventing properties.

INDUSTRIAL APPLICABILITY

The conductive member of this disclosure can be preferably used in, e.g., conductive roller, endless belt, conductive sheet.

REFERENCE SIGNS LIST

1 conductive roller
2 shaft member
3 elastic layer
4 surficial layer
5 microparticles
6 photosensitive drum
7 charging roller
8 toner
9 toner supply roller
10 developing roller
11 stratified blade
12 transfer roller
13 cleaning roller
21 endless belt
22 endless belt base
23 elastic layer

The invention claimed is:

1. A conductive roller, comprising an elastic layer and a surficial layer on the elastic layer; wherein the elastic layer is obtained by curing under ultraviolet ray radiation a composition containing a urethane (meth)acrylate oligomer (A), a photo polymerization initiator (B) and an ionic conductive agent (C), wherein:

the ionic conductive agent (C) contains an organic boron complex salt and a compound having a structure expressed with the following general formula (1), the organic boron complex salt being at least one member selected from the group consisting of borobis(1,1-diphenyl-1-oxo-acetyl)potassium, borobis(1,1-diphenyl-1-oxo-acetyl)lithium, and borobis(1,1-diphenyl-1-oxo-acetyl)sodium), and a compounding amount of the organic boron complex salt is 0.2 parts by mass or more per 100 parts by mass of a curing component in the composition, $$-SO_2-NX-SO_2- \quad (1)$$

where X represents an alkali metal.

2. The conductive roller according to claim 1, wherein: the compounding amount of the compound having the structure represented with the aforementioned general formula (1) is 0.1 to 4.0 parts by mass per 100 parts by mass of the curing component in the composition.

3. The conductive roller according to claim 1, wherein: the alkali metal X in the general formula (1) is potassium.

4. The conductive roller according to claim 1, wherein: the composition which is cured by radiating ultraviolet ray further contains a monomer having a hydroxyl group skeleton.

5. The conductive roller according to claim 1, further comprising a shaft member.

6. An image forming device comprising the conductive roller according to claim 5.

* * * * *